United States Patent
Akiyama

(10) Patent No.: US 7,364,312 B2
(45) Date of Patent: Apr. 29, 2008

(54) LIGHT SOURCE LAMP AND PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 10/999,935

(22) Filed: Dec. 1, 2004

(65) Prior Publication Data

US 2005/0128440 A1    Jun. 16, 2005

(30) Foreign Application Priority Data

Dec. 10, 2003   (JP)  ............................. 2003-411847
Sep. 6, 2004   (JP)  ............................. 2004-258007

(51) Int. Cl.
    *G03B 21/28*     (2006.01)
    *F21V 7/00*     (2006.01)

(52) U.S. Cl. ........................................ 353/99; 362/298

(58) Field of Classification Search .................. 353/38, 353/98, 99, 102; 362/296, 297, 298
See application file for complete search history.

(56) References Cited

U.S. PATENT DOCUMENTS

| | | | | |
|---|---|---|---|---|
| 1,110,955 A | * | 9/1914 | Matisse et al. | ............. 362/284 |
| 1,748,057 A | * | 2/1930 | Arbuckle | .................... 362/298 |
| 2,993,987 A | * | 7/1961 | Diffie | ........................ 362/298 |
| 4,739,152 A | * | 4/1988 | Downs | ........................ 392/421 |
| 4,755,916 A | * | 7/1988 | Collins | ....................... 362/236 |
| 5,121,983 A | * | 6/1992 | Lee | ................................ 353/8 |
| 5,142,387 A | * | 8/1992 | Shikama et al. | ................ 349/9 |
| 5,491,525 A | | 2/1996 | Yamasaki et al. | |
| 5,574,328 A | * | 11/1996 | Okuchi | ........................ 313/114 |
| 5,695,277 A | * | 12/1997 | Kim | ............................. 362/299 |
| 5,754,260 A | | 5/1998 | Ooi et al. | |
| 6,120,166 A | * | 9/2000 | Price | ........................... 362/302 |
| 6,641,293 B2 | * | 11/2003 | Kumar et al. | ............... 362/539 |
| 7,066,608 B2 | * | 6/2006 | Davis et al. | .................. 353/98 |

FOREIGN PATENT DOCUMENTS

| | | |
|---|---|---|
| JP | A-8-31382 | 2/1996 |
| JP | A-9-120067 | 5/1997 |
| JP | A 10-311962 | 11/1998 |
| JP | A 2001-110217 | 4/2001 |
| WO | WO 03/33959 A1 | 4/2003 |

* cited by examiner

*Primary Examiner*—Rodney Fuller
(74) *Attorney, Agent, or Firm*—Oliff & Berridge PLC

(57) ABSTRACT

A light source lamp, in which reduction of the available amount of illumination light on an illuminated region side can be reduced or suppressed, heightens light utilizing efficiency. The light source lamp has a light emitting tube having a luminous part in which a pair of electrodes arranged along an illumination light axis are built, an ellipsoidal reflector which reflects light from the luminous part and emits its reflection light as illumination light to an illuminated region side, and an auxiliary mirror which is arranged on the illuminated region side of the luminous part, has a reflection concave surface of a nearly hemispherical shape, and reflects the light from the luminous part on the ellipsoidal reflector. A center Q of curvature of the auxiliary mirror is arranged in a position distant from a center P of the luminous part to the illuminated region side along the illumination light axis.

10 Claims, 5 Drawing Sheets

LIGHT SOURCE LAMP AND PROJECTOR

BACKGROUND

An exemplary embodiment of the present invention relates to a light source lamp and a projector.

Generally, as known in the related art, a light source lamp of a projector includes a light emitting tube, and a reflector which reflects light from this light emitting tube and emits this light to an illuminated region side as illumination light. Further, as to this type of related art light source lamp, a lamp has an auxiliary mirror arranged on the illuminated region side and reflects light from a light emitting tube onto the reflector. (See, for example, JP-A-8-31382 (FIG. 1).

According to such a light source lamp, stray light of the light from the light emitting tube, which is not adapted for use, can be effectively utilized. Further, it is not necessary to set the size of the reflector to such a size as to cover the illuminated-region-sided end part, so that the size of the reflector can be reduced, and the size of the projector can be reduced.

SUMMARY

However, increases in luminance of the projector causes the inside of the light emitting tube composed of a high pressure mercury-vapor lamp to be in a very high-pressure state (for example, 200 Pascal and more). Therefore, in the light emitting tube, in order to resist this air pressure, quartz glass constituting a bulb of the light emitting tube has been made thick and a seal type referred to as shrink seal has been adopted. As a result, though high output from the light emitting tube can be obtained, there is a problem that light utilizing efficiency is lowered.

FIGS. 6A-6B are schematics explaining a light source lamp having such a high luminance. FIG. 6A is a partially enlarged schematic showing the sectional structure of the light source lamp, and FIG. 6B is a schematic in which a light ray is shown in FIG. 6A. In the FIGS. 6A and 6B, a reflector is omitted.

In a tube bulb of a light emitting tube 912 used in this light source lamp, as shown in FIG. 6A, parts distant from attachment portions of electrodes 905, 906 are thicker than parts close to the attachment portions. Therefore, as shown in FIG. 6B, of the radiation light from the light emitting tube 912, the light reflected on a reflection concave surface $916_{is}$, of an auxiliary mirror 916, does not run toward a center Q of curvature (i.e., center P of the luminous part, middle point of a line connecting a pair of electrodes 905 and 906) of the reflection concave surface $916_{is}$, and shifts to the reflector side (side opposite to an illuminated region side of the auxiliary mirror 916) due to the lens effect of the tube bulb of the light emitting tube.

Therefore, since such light does not pass near a focus (in the case of an ellipsoidal reflector, near a first focus of the ellipsoidal reflector; in the case of a paraboloidal reflector, near a focus of the paraboloidal reflector), quality of the illumination light lowers (in the case of the ellipsoidal reflector, light collecting property lowers; and in the case of the paraboloidal reflector, a parallel level lowers), so that the available amount of illumination light on the illuminated region side is reduced, and light utilizing efficiency lowers. Further, such light may collide with the electrode 905 on the reflector side. In this case, also, the available amount of illumination light on the illuminated region side is reduced, and light utilizing efficiency lowers. The related art light source lamp had such problems.

Therefore, exemplary embodiments of the present invention address or solve the above discussed problems. The exemplary embodiments provide a light source lamp and a projector in which reduction of the available amount of illumination light on the illuminated region side can be reduced or suppressed, thereby heightening the light utilizing efficiency.

In an exemplary embodiment, a light source lamp includes a light emitting tube having a luminous part in which a pair of electrodes arranged along an illumination light axis are built, a reflector which reflects the light from the luminous part and emits its light as illumination light to an illuminated region side, and an auxiliary mirror which is arranged on the illuminated region side of the luminous part, has a reflection concave surface of a nearly hemispherical shape, and reflects the light from the luminous part on the reflector, is provided such that a center of curvature of the auxiliary mirror is arranged in a position distant from a luminous center of the luminous part to the illuminated region side along the illumination light axis.

Therefore, according to the light source lamp of the invention, a luminous flux which is radiated from the luminous center of the luminous part of the light emitting tube and runs toward the auxiliary mirror; even if after it has refracted on the inner surface and the outer surface of a tube bulb of the luminous part and emitted from the luminous part, it is reflected by the auxiliary mirror and refracted again on the inner surface and the outer surface of the luminous part; can be returned near the luminous center of the luminous part. Namely, of the radiation light from the light emitting tube, the light reflected on the reflection concave surface of the auxiliary mirror, without colliding with the electrode on the reflector side, passes near a focus of the reflector (in case of an ellipsoidal reflector, near a first focus of the ellipsoidal reflector; in case of a paraboloidal reflector, near a focus of the paraboloidal reflector), and is emitted toward the reflector. The luminous flux reflected by the auxiliary mirror, similarly to the light that is directly incident from the luminous center of the luminous part onto the reflector, can be incident onto the reflector. Therefore, loss of light radiated from the light emitting tube can be reduced or prevented, and decrease of quality of the illumination light is reduced or suppressed as much as possible, so that reduction of the available amount of illumination light on the illuminated region side is reduced or suppressed, and light utilizing efficiency can be enhanced or improved.

In the light source lamp of the invention, it is preferable that the dimension d between a center of the luminous part and a center of curvature of the auxiliary mirror is set to the dimension satisfying the following inequality: $0.0081 \times D \leq d \leq 0.048 \times D$, where D is a radius of curvature of the reflection concave surface.

By such the constitution, as shown in exemplary embodiments described below, reduction of the available amount of illumination light on the illuminated region side is effectively reduced or suppressed, and the light utilizing efficiency can be effectively enhanced or improved.

In an exemplary embodiment, the reflector of the light source lamp is an ellipsoidal reflector which emits the luminous flux emitted from a first focus position as a luminous flux converging toward a second focus position; and the first focus of the ellipsoidal reflector coincides nearly with the luminous center of the luminous part.

In an exemplary embodiment the reflector of the light source lamp is alternatively a paraboloidal reflector which emits the luminous flux emitted from a focus position as light parallel to the illumination light axis; and the focus position of the paraboloidal reflector coincides nearly with the luminous center of the luminous part.

According to exemplary embodiments of the light source lamp of the invention, in any type of reflector, the light utilizing efficiency can be enhanced or improved.

In an exemplary embodiment, a projector of the invention, which includes an illumination device having a light source lamp which emits illumination light to an illuminated region side, an electro-optic modulator which modulates the illumination light emitted from the illumination device according to image data, and a projection lens which projects the light modulated by the electro-optic modulator, the light source lamp being any one of the above-described light source lamps.

Therefore, since the projector of an exemplary embodiment includes the superior light source lamp which can enhance or improve the light utilizing efficiency effectively, it has higher luminance.

DETAILED DESCRIPTION OF EMBODIMENTS

A light source lamp and a projector to which exemplary embodiments of the present invention are applied will be described below with reference to exemplary embodiments shown in the figures.

First, a projector according to a first exemplary embodiment of the invention will be described with reference to FIG. 1.

Figure 1:
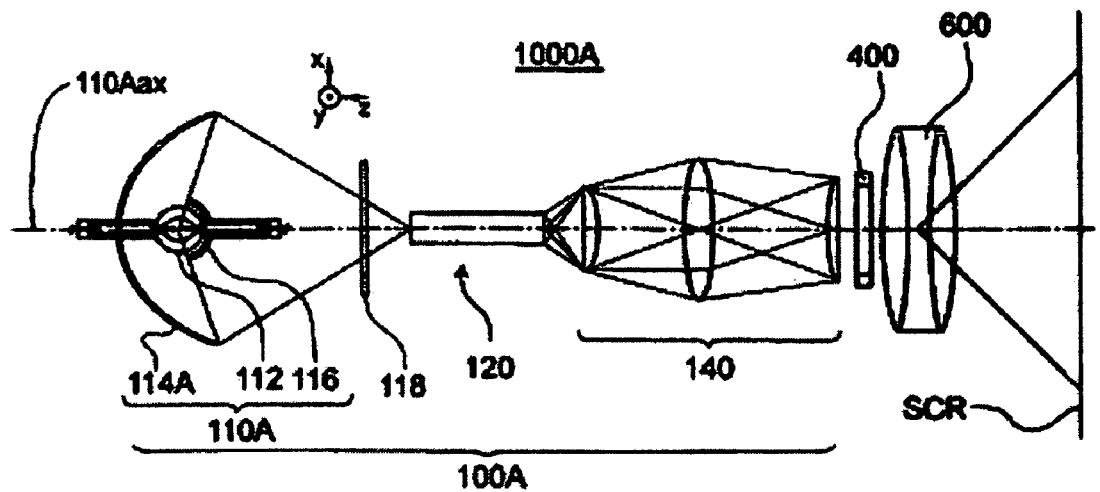
FIG. 1 is a schematic showing an optical system of a projector in an exemplary embodiment of the present invention.

FIG. 1 is a schematic showing an optical system of a projector according to a first exemplary embodiment of the present invention. In the following description, three directions orthogonal to one another are respectively taken as a z-direction (direction of an illumination light axis 110Aax in FIG. 1), an x-direction (direction parallel to a paper surface in FIG. 1 and orthogonal to the z-axis), and a y-direction (direction perpendicular to the paper surface in FIG. 1 and orthogonal to the z-axis).

A projector 1000A according to an exemplary embodiment of the present invention, as shown in FIG. 1, includes an illumination device 100A, a liquid crystal display device 400 as an electro-optic modulator, and a projection lens 600.

The illumination device 100A includes a light source lamp 100A, an integrator rod 120, and a relay optical system 140. Between the light source lamp 110A and the integrator rod 120, an infrared mirror 118 is arranged.

Figure 2:
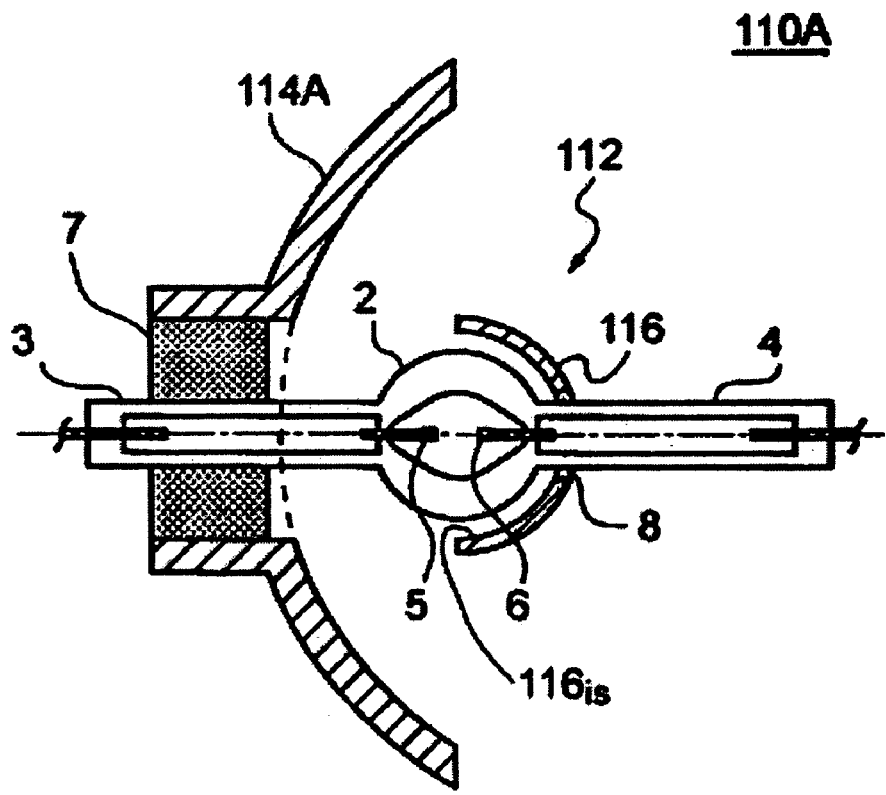
FIG. 2 is a sectional view showing a light source lamp in an exemplary embodiment of the present invention.

FIG. 2 is a sectional view showing the light source lamp according to the first exemplary embodiment.

The light source lamp 110A, as shown in FIGS. 1 and 2, includes a light emitting tube 112, an ellipsoidal reflector 114A, and an auxiliary mirror 116.

The light emitting tube 112 includes a luminous part 2 in which a pair of tungsten-made electrodes 5 and 6 arranged along the illumination light axis 110Aax are built, and seal parts 3, 4 coupling to the front and back (both side parts in FIG. 2) of the luminous part 2. The whole of the light emitting tube 112 is formed by a tube member made of quartz glass. The luminous part 2 is composed of a hollow spherical body, and seals mercury, rare gas, and halogen therein.

As the light emitting tube 112, various light emitting tubes which emit high-intensity light can be adopted, for example, a metal haloid lamp, a high pressure mercury-vapor lamp, and a super high pressure mercury-vapor lamp.

Further, the luminous part 2 is arranged near a first focus position on the ellipsoidal reflector side of two focuses (first focus and second focus) of the ellipsoidal reflector 114A. The ellipsoidal reflector 114A collects the luminous flux emitted from the first focus position on the second focus position. In the seal parts 3 and 4, metal foils respectively connecting to the electrodes 5 and 6 are sealed. Lead wires for external connection are connected to the metal foils, respectively.

When the voltage is applied to the lead wires, potential difference is produced through the metal foils between the electrodes 5 and 6, and discharge is produced, so that an arc image is generated and the luminous part 2 emits light.

Further, on the peripheral surface of the luminous part 2, antireflection coating of a multi-layered film including a tantalum oxide film, a hafnium oxide film, and a titanium oxide film is applied, whereby optical loss due to reflection of the light passing through the peripheral surface can be reduced.

In an exemplary embodiment, the ellipsoidal reflector 114A, as shown in FIG. 2, has the two focuses (first focus and second focus) located on the illumination light axis 110Aax; includes a rotary ellipsoidal reflection part which reflects the light from the luminous part 2 thereby to emit light to the illuminated region side as illumination light, and a sleeve-shaped neck part having a through-hole into which the seal part 3 of the light emitting tube 112 is inserted and fixed. The through-hole of the neck part is arranged along a center axis (illumination light axis 110Aax) of the rotary ellipsoidal surface of the reflection part of the ellipsoidal reflector 114A. Into the through-hole of the neck part, the seal part 3 of the light emitting tube 112 is fixed with inorganic adhesive such as cement.

In an exemplary embodiment, the reflection part of the ellipsoidal reflector 114A has a reflection surface formed by evaporating a metal thin film on the rotary ellipsoidal glass surface, and this reflection surface functions as a cold mirror which reflects visible light and transmits infrared rays.

This ellipsoidal reflector 114A, when the light emitting tube 112 is lightened, reflects the luminous flux radiated from the luminous part 2 on the reflection surface, and emits convergent light which converges in the second focus position of the rotary ellipsoidal surface.

In an exemplary embodiment, the auxiliary mirror 116 is arranged on the illuminated region side of the luminous part 2 so as to be opposed to the ellipsoidal reflector 114A with the luminous part 2 between, and reflects the light from the luminous part 2 toward the luminous part 2, whereby its reflection light is incident onto the ellipsoidal reflector 114A. The auxiliary mirror 116 includes a through-hole for auxiliary mirror attachment, which perforates in the direction of the illumination light axis 110Aax, and into which the seal part 4 of the light emitting tube 112 is inserted and fixed; and a concave mirror having such a reflection concave surface $116_{is}$ of a nearly hemispherical shape as to cover the illuminated-region-sided surface of the luminous part 2. For example, radius D of curvature of the reflection concave surface $116_{is}$ is set to a dimension of D=6.2 mm. The auxiliary mirror 116 is fixed on the seal part 4 with inorganic adhesive 8, such as cement.

In an exemplary embodiment, the auxiliary mirror 116 is formed of inorganic material, such as quartz glass, light-transmissive alumina, sapphire, or ruby. On the reflection concave surface $116_{is}$ of the auxiliary mirror 116, a reflection layer is formed by evaporating metal. This reflection layer functions as a cold mirror which reflects visible light similarly to the reflection surface of the ellipsoidal reflector 114A and transmits infrared rays and ultraviolet rays. In an exemplary embodiment, when in use with a projector, the infrared rays pass through the auxiliary mirror 116 and thereby suppress the increase of temperature of the auxiliary mirror 116, and the reflected light from the light emitting tube 112 is effectively utilized.

As the reflection layer of the reflection concave surface $116_{is}$, a dielectric multi-layer film is formed by laminating a $Ta_2O_5$ film and a $SiO_2$ film alternately. In an exemplary embodiment, when in use with a projector, the infrared rays pass through the auxiliary mirror 116 thereby to reduce or suppress the increase of temperature of the auxiliary mirror 116, and the reflected light by the auxiliary mirror 116 is effectively utilized.

By attaching the auxiliary mirror 116 to the light emitting tube 112, the luminous flux radiated to the opposite side (illuminated region side) to the side on which the ellipsoidal reflector 114A is arranged, of the luminous fluxes radiated from the luminous part 2, is reflected to the ellipsoidal reflector 114A side by the reflection concave surface $116_{is}$ of this auxiliary mirror 116, and further reflected on the reflection surface of the ellipsoidal reflector 114A, so that its reflection light is emitted from the reflection part of the ellipsoidal reflector 114A and emitted so as to converge toward the second focus position.

As described above, by using such an auxiliary mirror 116, the luminous flux radiated from the luminous part 2 to the opposite side (front side) to the ellipsoidal reflector 114A side can be converged in the second focus position of the ellipsoidal reflector 114A similarly to the luminous flux that is incident directly onto the reflection surface of the ellipsoidal reflector 114A from the luminous part 2.

In the related art, a light source lamp not having the auxiliary mirror 116, since the luminous flux emitted from the light emitting tube must be converged in the second focus position by only the ellipsoidal reflector, the reflection part of the ellipsoidal reflector must be widened.

However, by providing the auxiliary mirror 116, the luminous flux radiated from the luminous part 2 to the opposite side (illuminated region side) to the ellipsoidal reflector 114A side can be reflected on the ellipsoidal reflector 114A side by the auxiliary mirror 116 so as to be incident on the reflection surface of the ellipsoidal reflector 114A. Therefore, even in the case that the reflection part of the ellipsoidal reflector 114A is small, almost all of the luminous fluxes emitted from the luminous part 2 can be emitted so as to converge in the fixed position, so that the dimension in direction of the illumination light axis 110Aax of the ellipsoidal reflector 114A and its opening diameter can be made small. Namely, the light source lamp 110A and the projector 1000A can be miniaturized, and layout to build the light source lamp 110A into the projector 1000A is also facilitated.

Further, by providing the auxiliary mirror 116 in order to make a light collective spot diameter at the second focus small, even in case that the first focus of the ellipsoidal reflector 114A and the second focus thereof are brought close to each other, almost all of the light radiated from the luminous part 2 is collected at the second focus by the ellipsoidal reflector 114A and the auxiliary mirror 116 and becomes available, so that the light utilizing efficiency can be enhanced or improved greatly. Thus, a light emitting tube of comparatively low output can be also adopted, and the temperature of the light emitting tube 112 and the temperature of the light source lamp 110A can be also lowered.

Figure 3A:
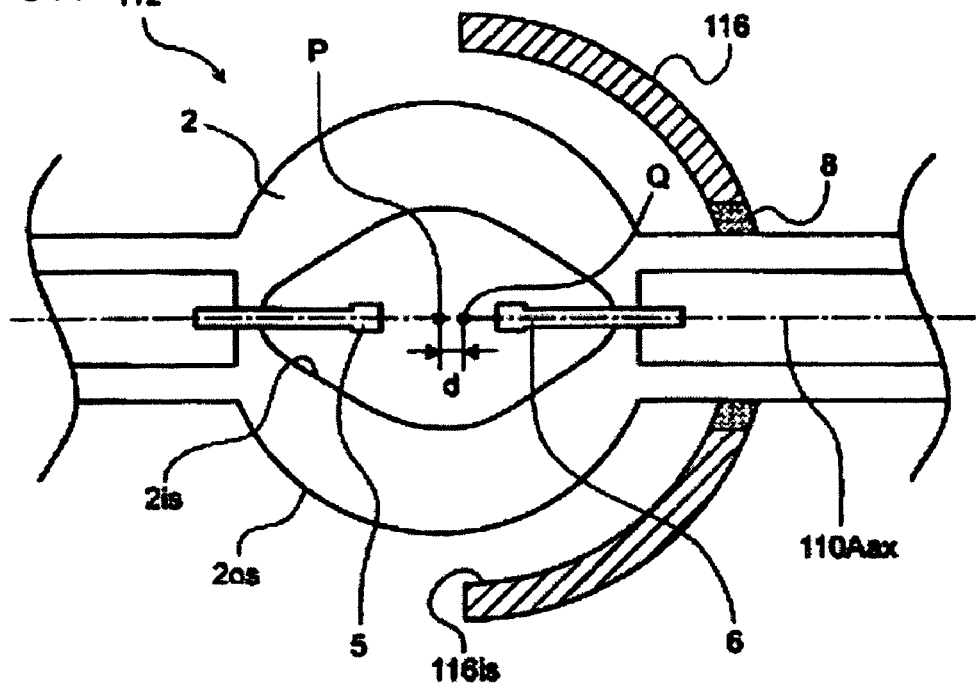
FIGS. 3A and 3B are schematics showing an effect of the light source lamp in an exemplary embodiment of the present invention.
Figure 3B:
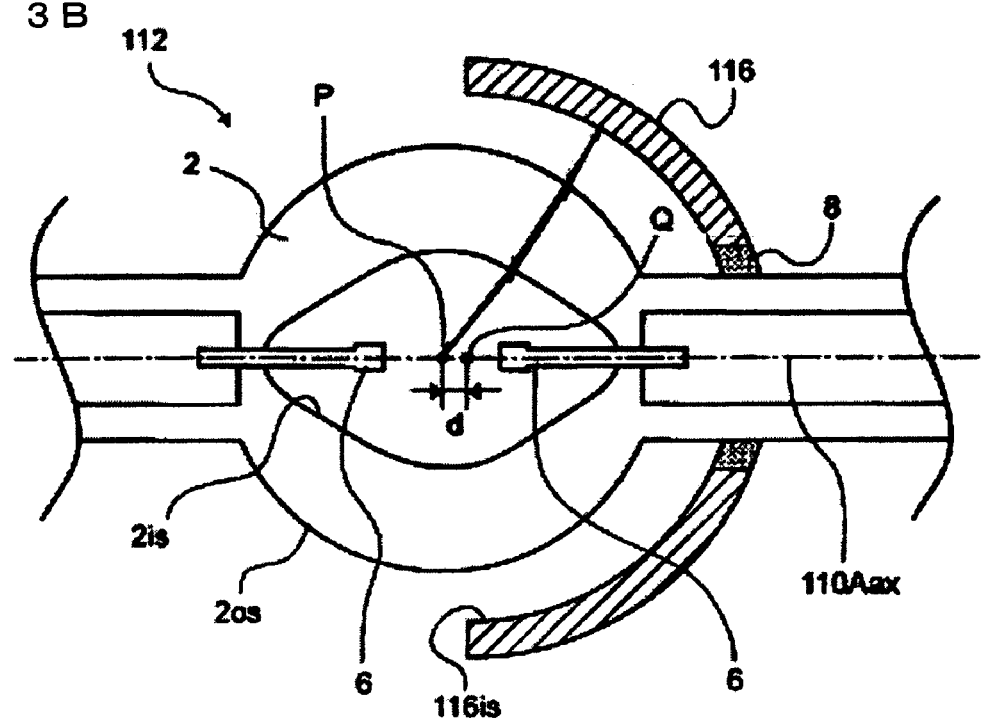

FIGS. 3A and 3B are schematics explaining the light source lamp 110A according to the first exemplary embodiment. FIG. 3A is a partial sectional view showing a main portion of the light source lamp, and FIG. 3B is a schematic in which a light ray is shown in FIG. 3A.

The auxiliary mirror 116, as shown in FIG. 3A, has the reflection concave surface $116_{is}$ of a nearly hemispherical shape. A center Q of curvature of the auxiliary mirror 116 is arranged in a position distant, by a predetermined distance, from a center P (middle point of a line connecting a pair of electrodes 5 and 6) of the luminous part 2, toward the illuminated region side along the illumination light axis 100Aax.

The luminous flux which is radiated from the luminous center P of the luminous part 2 and runs toward the auxiliary mirror 116, even if after it is refracted on the inner surface and the outer surface of the luminous part 2 (by lens effect) and emitted from the luminous part 2, is reflected by the reflection concave surface $116_{is}$ of the auxiliary mirror 116 and refracted again on the inner surface and the outer surface of the luminous part 2, becomes a luminous flux that passes through the luminous center P of the luminous part 2 and is emitted toward the ellipsoidal reflector 114A from the luminous part 2.

Therefore, according to the light source lamp 110A in the first exemplary embodiment, of the radiation light from the light emitting tube 112, the light reflected on the reflection concave surface $116_{is}$ of the auxiliary mirror 116, without colliding with the electrode 5 on the ellipsoidal reflector side 114A, unlike the related art case, passes near the focus (in case of an ellipsoidal reflector, near a first focus of the ellipsoidal reflector; and in case of a paraboloidal reflector, near a focus of the paraboloidal reflector), and can be incident onto the ellipsoidal reflector 114A similarly to the light running directly to the ellipsoidal reflector 114A from the luminous part 2. Accordingly, loss of the light emitted from the luminous part 2 can be reduced or prevented, and decrease of quality of the illumination light is reduced or suppressed as much as possible. Therefore, in the light source lamp 110A, according to the first exemplary embodiment, reduction of the available amount of illumination light on the illuminated region side is reduced or suppressed, and light-utilizing efficiency can be enhanced or improved.

In the light source lamp 110A, according to the first exemplary embodiment, the dimension d between a center Q of curvature of the auxiliary mirror 116 and a center P of the luminous part 2 is set to the dimension satisfying the following inequality: $0.0081 \times D < d \leq 0.048 \times D$, wherein D is a radius of curvature of the reflection concave surface $116_{is}$. In this exemplary embodiment, since the radius of curvature D of the auxiliary mirror 116 is, for example, 6.2 mm, the center Q of curvature thereof is arranged in a position distant from the center P of the luminous part 2 to the illuminated region side along the illumination light axis 110Aax by 0.05 mm to 0.3 mm (0.05 mm$\leq$d$\leq$0.3 mm). Thus, the reduction of the available amount of illumination light on the illuminated region side is reduced or suppressed, and the light utilizing efficiency can be effectively enhanced or improved.

By the above constitution, according to the light source lamp 110A in the first exemplary embodiment, similar to the conventional light source lamp, the light emitted from the light emitting tube 112 to the ellipsoidal reflector 114A side is reflected on the ellipsoidal reflector 114A and runs toward the illuminated region side. Further, the light emitted to the illuminated region side of the light emitting tube 112 is reflected by the auxiliary mirror 116 toward the luminous part 2, and this reflected light is incident in the ellipsoidal reflector 114A. At this time, the light emitted from the luminous part 2 to the auxiliary mirror 116 and reflected by the auxiliary mirror 116 toward the luminous part 2, even if it is refracted on the inner surface and the outer surface of the luminous part 2 (lens effect), passes the luminous center P of the luminous part 2, that is, near the focus of the ellipsoidal reflector 114A (in case of the ellipsoidal reflector, near the first focus of the ellipsoidal reflector; and in case of the paraboloidal reflector, near the focus of the paraboloidal reflector). Therefore, without losing the light emitted from the luminous part 2, decrease of quality of the illumination light is reduced or suppressed as much as possible. Consequently, in the light source lamp 110A according to the first exemplary embodiment, the reduction of the available amount of illumination light on the illuminated region side is reduced or suppressed, and light-utilizing efficiency can be enhanced or improved. This effect has been confirmed by the following experiment.

Exemplary Experiment (1) After the auxiliary mirror 116 (the radius D of curvature of the reflection concave surface 116$_{is}$ is 6.2 mm) was arranged so that the center Q of curvature can be located in the center P of the luminous part 2, the light emitting tube 112 was lightened, and transmission efficiency (%) and quantity of light (%) of the illumination light flux reaching a light incident surface of a liquid crystal display device 400 were measured, using a measuring device (not shown).

(2) The auxiliary mirror 116 (the radius D of curvature of the reflection concave surface 116$_{is}$ is 6.2 mm) was arranged so that the center Q of curvature can be located in a position distant from the center P of the luminous part 2 to the illuminated region side along the illumination light axis 110Aax by the dimension d (dimension between the center Q of curvature of the auxiliary mirror 116 and the center P of the luminous part 2: d=13 kinds of 0.02, 0.04, 0.06, 0.08, 0.10, 0.20, 0.22, 0.24, 0.26, 0.28, 0.30, 0.35, 0.40 mm). Thereafter, the light emitting tube 112 was lightened, and the transmission efficiency (%) and the quantity of light (%) of each illumination light flux reaching the light incident surface of the liquid crystal display device 400 were measured, using a measuring device (not shown).

Figure 4:
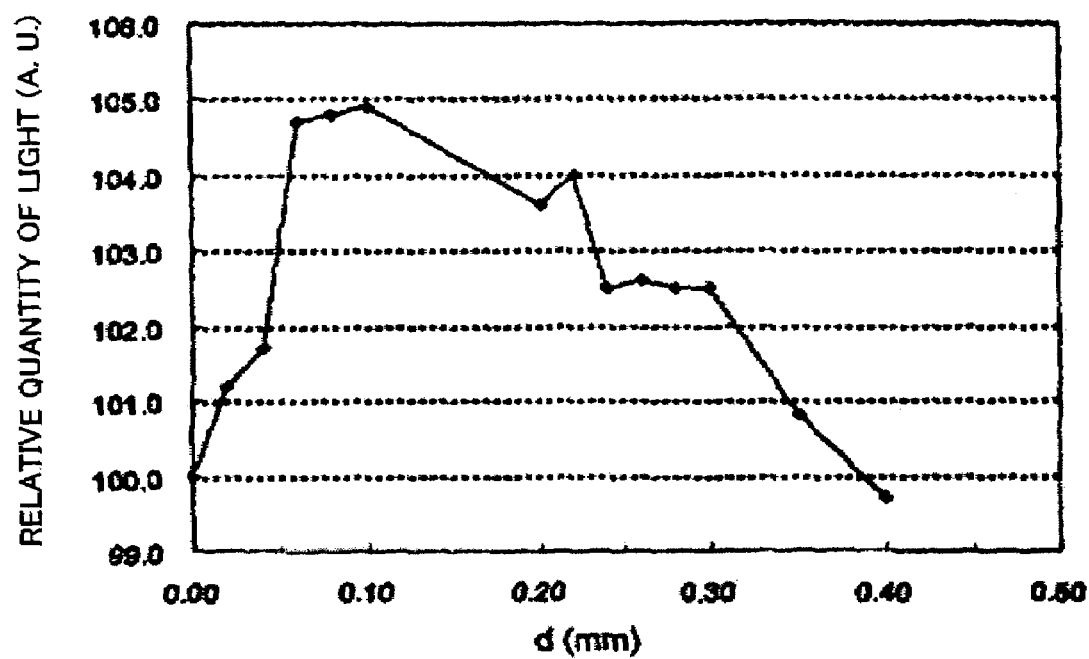
FIG. 4 is a chart showing the effect of the light source lamp in an exemplary embodiment of the present invention.

Results of these experiments (1) and (2) are shown in FIG. 4. In FIG. 4, the measured quantity of light (%) in (2) is represented by the relative quantity of light when the measured quantity of light (%) in (1) is taken as 1 (=100%).

As is clear from FIG. 4, in the case where the auxiliary mirror 116 is arranged so that the center Q of curvature can be located in the position distant from the center P of the luminous part 2 to the illuminated region side along the illumination light axis 110Aax by the dimension d (d=0.02, 0.04, 0.06, 0.08, 0.10, 0.20, 0.22, 0.24, 0.26, 0.28, 0.30, 0.35 mm), the reaching quantity of light radiated from the light emitting tube 112 to the illuminated region side increases. (The measured quantity of light is over 100%.)

Here, in consideration of the measurement error (up to about 1% of the measured quantity of light) by the measuring device, 102% relative quantity of light by which the desired effect can be surely obtained is taken as a threshold value. In the case where the above dimension d satisfies an inequality of 0.05 mm$\leq$d$\leq$0.30 mm, it is found that the reaching quantity of light radiated from the light emitting tube 112 to the illuminated region side increases.

Next, the radius D of curvature of the reflection concave surface 116$_{is}$ was changed from 6.2 mm to 6.0 mm and 6.4 mm, and measurement by the above experiment methods was executed. As a result, it was confirmed from these measurement results that in consideration of the measurement error by the measuring device, similar to the case in the above measurement, the dimensions d by which the desired effect (sure increase of the reaching quantity of light radiated from the light emitting tube 112 to the illuminated region side) can be obtained were 0.049 mm$\leq$d$\leq$0.29 mm (D=6.0 mm), and 0.05 mm$\leq$d$\leq$0.31 mm (D=6.4 mm).

Accordingly, in the light source lamp 110A according to the first exemplary embodiment, the dimension d (dimension d between the center Q of curvature of the auxiliary mirror 116 and the center P of the luminous part 2) by which the reaching quantity of light radiated from the light emitting tube 112 to the illuminated region side can be surely increased is set to the dimension satisfying the following inequality: 0.0081×D$\leq$d$\leq$0.048×D, wherein D is the radius of curvature of the reflection concave surface 116$_{is}$ of the auxiliary mirror 116. Namely, in case that this condition is satisfied, the great reduction of the available amount of illumination light on the illuminated region side can be reduced or suppressed, and the light utilizing efficiency can be heightened.

Figure 5:
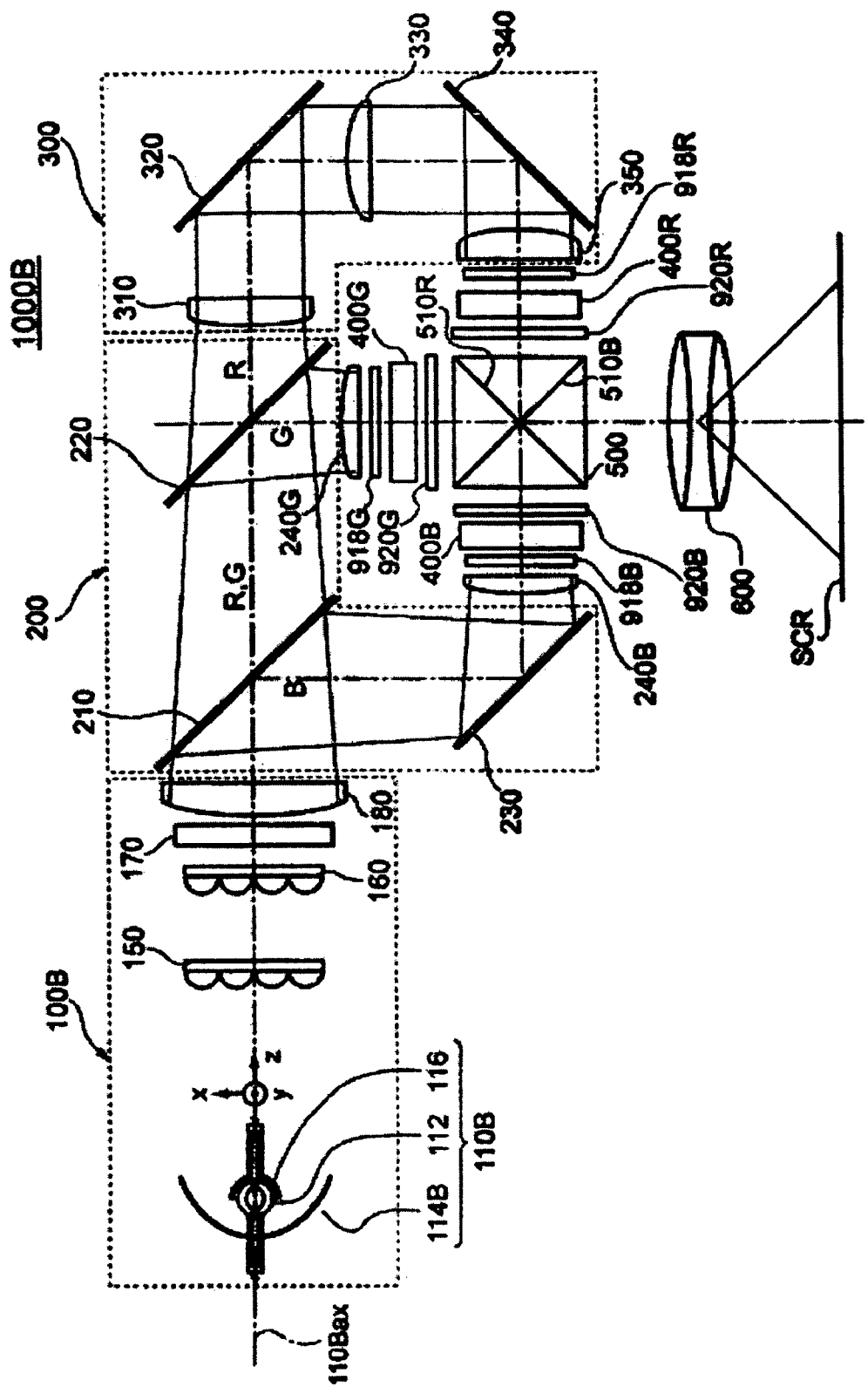
FIG. 5 is a schematic showing an optical system of a projector in an exemplary embodiment of the present invention.
Figure 6A:
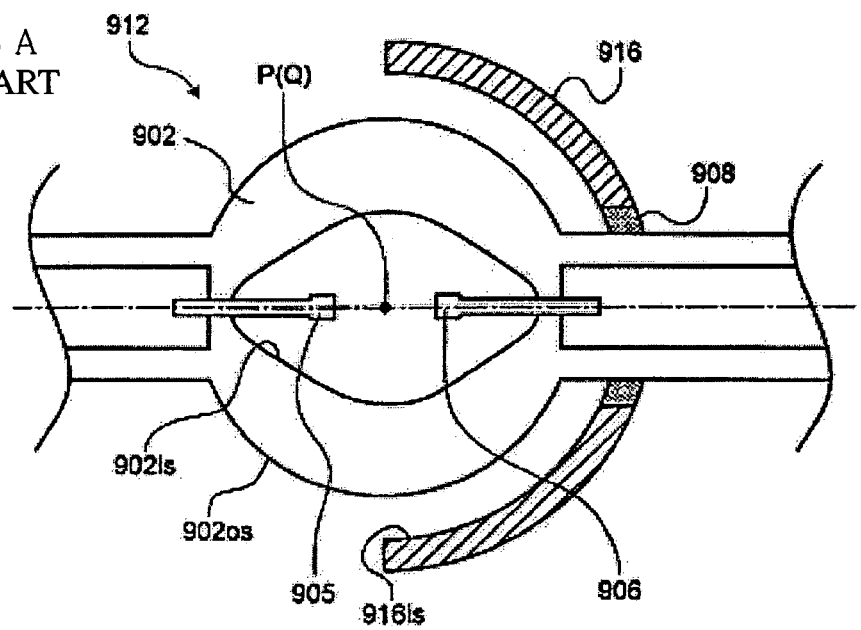
FIGS. 6A and 6B are schematics showing a problem of a related art light source lamp.
Figure 6B:
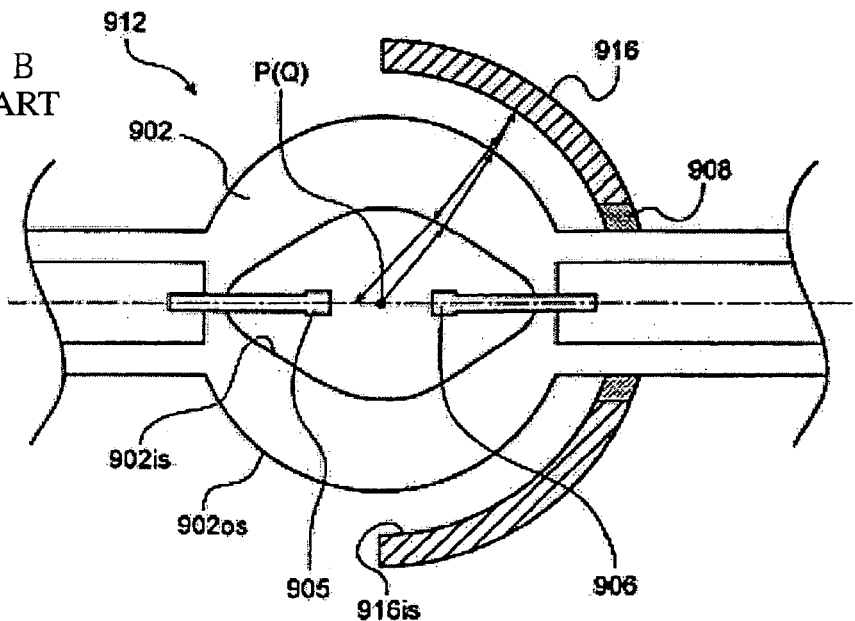

FIG. 5 is a schematic showing an optical system of a projector 1000B according to a second exemplary embodiment of the invention.

The projector 1000B according to the second exemplary embodiment, as shown in FIG. 5, is a three-plate type projector using three liquid crystal display devices 400R, 400G, and 400B.

This projector 1000B, as shown in FIG. 5, includes an illumination device 1000B, a color separation optical system 200, a relay optical system 300, an optical device, and a projection optical system 600. Optical elements and optical devices constituting these optical systems 100B to 300 are positioned and housed in a housing for optical parts in which a predetermined illumination light axis 110Bax is set.

In an exemplary embodiment, the illumination device 100B sets directions of luminous flux radiated from a luminous part 2 of a light emitting tube 112 in the fixed direction to illuminate an optical device 40. The illumination device 100B includes a light source lamp 110B, a first lens array 150, a second lens array 160, and a lens integrator optical system having a polarization converting element 170 and a superimposing lens 180. Further, the projector 1000B according to the second exemplary embodiment uses a paraboloidal reflector 114B as the light source lamp 110B.

In FIG. 5, in the light source lamp 110B, the light emitting tube 112, the paraboloidal reflector 114B, and an auxiliary mirror 116 are shown schematically. The light source lamp 110B has a lamp housing for holding these parts, and at a back stage in the luminous flux emitting direction of the paraboloidal reflector 114B, the integrator optical system is provided.

In an exemplary embodiment, the paraboloidal reflector 114B is attached to the light emitting tube 112 so that its focus position can nearly coincide with a luminous center P of the luminous part 2. The luminous fluxes radiated from the luminous center P of the luminous part 2, of which the emitted directions are set on an illuminated region side of the light source lamp 110B by the paraboloidal reflector 114B, are emitted to the integrator optical system as light parallel to the illumination light axis 110Bax.

In an exemplary embodiment, the integrator optical system is an optical system which divides the luminous flux emitted from the light source lamp 110B into plural partial luminous fluxes to unify plane luminance in the illumination region. This integrator optical system includes a first lens array 150, a second lens array 160, the polarization converting elements 170 and a superimposing lens 180.

The first lens array 150 has a function of a luminous flux dividing optical element which divides the luminous flux emitted from the light source lamp 110B into plural partial optical fluxes, and includes plural small lenses arranged in a matrix manner in a plane orthogonal to the illumination light axis 110Bax.

The second lens array 160 is an optical element which collects the plural partial luminous fluxes divided by the first lens array 150, and includes plural small lenses arranged in a matrix manner in a plane orthogonal to the illumination light axis 110Bax similarly to the first lens array 150.

The polarization converting element 170 sets polarization directions of the partial luminous fluxes divided by the first lens array 150 to linearly polarization in the nearly same direction.

The polarization converting element 170, though shown schematically, includes a polarizing separation film and a reflection film which are arranged inclined to the illumination light axis 100Bax and arranged alternately. The polarizing separation film transmits one of a P polarization luminous flux and an S polarization luminous flux that are included in each partial luminous flux, and reflects the other. The other reflected polarization luminous flux is bent by the reflection film and emitted in the emitting direction of one polarization luminous flux, that is, in the direction along the illumination light axis 100Bax. Any of the emitted polarization luminous fluxes is polarization-converted by a phase plate provided for a luminous flux emitting surface of the polarization-converting element 170, and the polarization directions of nearly all of the luminous fluxes are made uniform. By using such the polarization-converting element 170, the luminous fluxes emitted from the light emitting tube 112 can be made the polarization luminous fluxes in the nearly same direction. Therefore, utilizing efficiency of the light source light used in the optical device can be enhanced or improved.

The superimposing lens 180 is an optical element, which collects the plural partial luminous fluxes through the first lens array 150, the second lens array 160, and the polarization converting element 170, and superimposes them on image forming regions of three liquid crystal display devices of the optical device, which will described later.

The luminous flux emitted from this superimposing lens 180 is emitted to the color separation optical system 200.

In an exemplary embodiment, the color separation optical system 200 includes two dichroic mirrors 210, 220, and a reflection mirror 230, and has a function of separating the plural partial luminous fluxes emitted from the illumination device 100B into three-color light of red (R), green (G), and blue (B) by the dichroic mirrors 210, 220.

The dichroic mirror 210, 220 is an optical element having a wavelength selecting film on a base board, which reflects the luminous flux of the predetermined wavelength region and transmits the luminous fluxes of other wavelength regions. The dichroic mirror 210 arranged in the front stage of the light path is a mirror which reflects blue color light and transmits other color light. Further, the dichroic mirror 220 arranged in the back stage of the light path is a mirror which reflects green color light and transmits red color light.

The relay optical system 300 includes an incident side lens 310, a relay lens 330, and reflection mirrors 320, 340, and has a function of leading the red color light transmitted in the dichroic mirror 220 constituting the color separation optical system 200 to the optical device. A reason why such a relay optical system 300 is arranged in the light path of the red color light is that: since an optical path length of the red color light is longer than that of another color light, lowering of the light utilizing efficiency due to divergence of light is reduced or prevented. The exemplary embodiment, since the optical path length of the red color light is longer, adopts this constitution. However, by lengthening the optical path length of the blue color light, the relay optical system 300 may be used for the optical path length of the blue color light.

After the blue color light separated by the dichroic mirror 210 has been bent by the reflection mirror 230, it is supplied to the optical device through a field lens 240B. Further, the green color light separated by the dichroic mirror 220 is supplied directly to the optical device through a field lens 240G. Further, the red color light is collected and bent by the lenses 310, 330 and the reflection mirrors 320, 340 which constitute the relay optical system 300, and supplied through a field lens 350 to the optical device. Further, the field lenses 240B, 240G, and 350 are provided in the front stages of the optical paths of the respective color light of the optical device in order to convert each partial luminous flux emitted from the second lens array 160 into a telecentric luminous flux for the illumination light axis 100Bax.

The optical device modulates the incident luminous flux according to image data to thereby form a color image. This optical device includes liquid crystal display devices 400R, 400G, and 400B (a liquid crystal display device on the red color light side is taken as 400R, a liquid crystal display device on the green color light side is taken as 400G, and a liquid crystal display device on the blue color light side is taken as 400B) functioning as optical modulators that are objects of illumination, and a cross dichroic prism 500. Further, between each field lens 350, 240G, 240B and each liquid crystal display device 400R, 400G, 400B, each incident side polarizing plate 918R, 918G, 918B is interposed. Further, between each liquid crystal display device 400R, 400G, 400B and the cross-dichroic prism 500, each exit-side polarizing plate 920R, 920G, and 920B are interposed. By the incident side polarizing plates 918R, 918G, 918B, the liquid crystal display devices 400R, 400G, 400B, and the exit-side polarizing plates 920R, 920G, and 920B, optical modulation of each color incident light is performed.

In the liquid crystal display device 400R, 400G, 400B, liquid crystal that is an electro-optic material is sealed airtight in a pair of transparent glass substrates. Using a polysilicon TFT as a switching element, in accordance with the given image signal, the liquid crystal display device modulates the polarization direction of the polarization luminous flux emitted from the incident side polarizing plate 44.

The cross dichroic prism 500 is an optical element, which combines optical images modulated for the respective color light emitted from the exit-side polarizing plates 920R, 920G, and 920B to thereby form a color image. This cross-dichroic prism 500 is formed by sticking four right-angle prisms to one another, and it is nearly square-shaped, viewed in plane. On interfaces in which the right-angle prisms are stuck to one another, dielectric multilayer films are formed. One 510 R of the nearly X-shaped dielectric multilayer films reflects the red color light, and the other 510B reflects the blue color light. By these dielectric multilayer films, the red color light and the blue color light are bent, and their traveling directions are matched with the traveling direction of the green color light, whereby the three color lights are combined.

The color image emitted from the cross dichroic prism 500 is enlarged and projected by the projection optical system 600, and a large image is formed on a screen SCR.

The light source lamp 110B is provided with a light emitting tube 112 similar to that in the first exemplary embodiment.

As described above, the projector 1000B according to the second exemplary embodiment is different from the projector 1000A according to the first exemplary embodiment in the number of the liquid crystal display devices, the kind of integrator optical system, and the kind of reflector. However, similarly to the case of the projector 1000A according to the first exemplary embodiment, a center of curvature of an auxiliary mirror 116 is arranged in a position distant from a center of the luminous part to the illuminated region side along the illumination light axis 110Bax.

Therefore, also by the light source lamp 110B according to the second exemplary embodiment, the light reflected by the reflection concave surface of the auxiliary mirror 116, of the radiation light from the luminous center P of the luminous part 2 of the light emitting tube 112, without colliding with the electrode on the paraboloidal reflector 114B side, runs toward the vicinity of the luminous center P of the luminous part, and passes near the focus of the paraboloidal reflector 114B (in case of the ellipsoidal reflector, near the first focus of the ellipsoidal reflector; and in case of the paraboloidal reflector, near the focus of the paraboloidal reflector). Therefore, without losing the light emitted from the luminous part 2, a decrease of quality of the illumination light is reduced or suppressed as much as possible. Consequently, in the light source lamp 110B, according to the second exemplary embodiment, the reduction of the available amount of illumination light on the illuminated region side is reduced or suppressed, and light-utilizing efficiency can be enhanced or improved.

The invention is not limited to the above exemplary embodiments, but various embodiments can be made without departing from the spirit of the invention. For example, the following exemplary modification can be made.

Though the illumination device 100A of the projector 1000A, according to the first exemplary embodiment, uses the light source lamp 110A having the ellipsoidal reflector 114A, it may use the light source lamp 110B having the paraboloidal reflector 114B from the second exemplary embodiment. However, in case that the illumination device 100A uses the light source lamp 110B, a collective lens which collects the parallel light emitted from the light source lamp 110B on an incident part of the integrator rod 120 is provided between the light source lamp 110B and the integrator rod 120.

Though the illumination device 100B of the projector 1000B, according to the second exemplary embodiment, uses the light source lamp 110B having the paraboloidal reflector 114B, it may use the light source lamp 110A having the ellipsoidal reflector 114A from the first exemplary embodiment. However, in case that the illumination device 100B uses the light source lamp 110A, a parallelization concave lens is provided between the light source lamp 110A and the first lens array in order to emit in parallel the collection light emitted from the light source lamp 110A on the incident surface of the first lens array. Further, this parallelization concave lens may be integrated with the light source lamp 110A or may be provided separately.

In the second exemplary embodiment, only the example of the projector 1000B using the three liquid crystal display devices 400R, 400G, and 400B is given. However, the invention can be also applied to a projector using only one liquid crystal panel, a projector using two liquid crystal panels, or a projector using four or more liquid crystal panels.

In the projectors according to the above described exemplary embodiments, the illumination device of the invention is applied to the transmission type projector. However, the invention can be also applied to a reflection type projector. Here, the "transmission type" device that the elector-optic modulator as the optical modulation device is a type of transmitting light, such as a transmission type liquid crystal panel, and the "reflection type" means that the elector-optic modulator as the optical modulation device is a type of reflecting light, such as a reflection type liquid crystal panel. Also in the case where the invention is applied to the reflection type projector, the almost similar effect to the effect in the transmission type projector can be obtained.

In the projectors according to the above described exemplary embodiments, though the liquid crystal panel is used as the electro-optic modulator, the invention is not limited to this. As long as the electro-optic modulator modulates generally the incident light according to the image data, any modulator, for example, a micro-mirror type modulator may be used. As the micro-mirror type modulator, for example, a DMD (digital micro-mirror device) can be used.

In addition, the invention can be also applied to a front projection type projector which projects a projection image from a viewing side, or a rear projection type projector which projects a projection image from the opposite side to a viewing side.

Though the best constitution to embody the invention has been disclosed in the above description, the invention is not limited to this. Namely, though the invention has been shown and described in terms of the specific exemplary embodiments, those skilled in the art, without departing from the technical spirit of the invention, can make various modifications in the shape, material, number of parts, or other detailed constitution in the above-described exemplary embodiments.

Accordingly, the description in which the above-disclosed shape and the material of parts have been limited is illustrative in order to facilitate understanding of the invention and not restrictive. Therefore, the descriptions of the parts by their names, a part or all of limitation of which are released in the shape and material, are included in the invention.

What is claimed is:

1. A light source lamp, comprising:
   a light emitting tube having a luminous part in which a pair of electrodes arranged along an illumination light axis are built;
   a reflector which reflects light from the luminous part and emits illumination light to an illuminated region side; and
   an auxiliary mirror arranged on the illuminated region side of the luminous part, having a reflection concave surface of a substantially hemispherical shape, and reflecting the light from the luminous part toward the luminous part, a center of curvature of the auxiliary mirror being arranged in a position that is on the illuminated region side of a center of the luminous part, and is in the luminous part.

2. The light source lamp according to claim 1, a dimension d between a center of the luminous part and the center of curvature of the auxiliary mirror being set to a dimension satisfying the following inequality: $0.0081 \times D \leq d \leq 0.048 \times D$, where D is a radius of curvature of the reflection concave surface.

3. The light source lamp according to claim 1,
the reflector being an ellipsoidal reflector which emits luminous flux emitted from a first focus position as a luminous flux collecting toward a second focus position; and
the first focus position of the ellipsoidal reflector coinciding substantially with a luminous center of the luminous part.

4. The light source lamp according to claim 1,
the reflector being a paraboloidal reflector which emits a luminous flux emitted from a focus position as light parallel to the illumination light axis; and
the focus position of said paraboloidal reflector coinciding substantially with a luminous center of the luminous part.

5. The light source lamp according to claim 1,
the light irradiated from the luminous center toward the auxiliary mirror being refracted on the inner surface and the outer surface of the luminous part, and
the light reflected by the refection concave surface of the auxiliary mirror being refracted on the inner surface and the outer surface of the luminous part and passing near the luminous center of the luminous part.

6. A projector, comprising:
an illumination device having a light source lamp which emits illumination light to an illuminated region side;
an electro-optic modulator which modulates the illumination light emitted from the illumination device according to image data; and
a projection lens which projects the illumination light modulated by the electro-optic modulator, the light source lamp including:
a light emitting tube having a luminous part in which a pair of electrodes arranged along an illumination light axis are built;
a reflector which reflects light from the luminous part and emits illumination light to an illuminated region side; and
an auxiliary mirror arranged on the illuminated region side of the luminous part, having a reflection concave surface of a substantially hemispherical shape, and reflecting the light from the luminous part toward the luminous part, a center of curvature of the auxiliary mirror being arranged in a position that is on the illuminated region side of a center of the luminous part, and is in the luminous part.

7. The projector according to claim 6, a dimension d between a center of the luminous part and the center of curvature of the auxiliary mirror being set to a dimension satisfying the following inequality: $0.0081 \times D \leq d \leq 0.048 \times D$, where D is a radius of curvature of the reflection concave surface.

8. The projector according to claim 6,
the reflector being an ellipsoidal reflector which emits luminous flux emitted from a first focus position as a luminous flux collecting toward a second focus position; and
the first focus position of the ellipsoidal reflector coinciding substantially with a luminous center of the luminous part.

9. The projector according to claim 6,
the reflector being a paraboloidal reflector which emits a luminous flux emitted from a focus position as light parallel to the illumination light axis; and
the focus position of said paraboloidal reflector coinciding substantially with a luminous center of the luminous part.

10. The projector according to claim 6,
the light irradiated from the luminous center toward the auxiliary mirror being refracted on the inner surface and the outer surface of the luminous part, and
the light reflected by the refection concave surface of the auxiliary mirror being refracted on the inner surface and the outer surface of the luminous part and passing near the luminous center of the luminous part.

* * * * *